United States Patent
Smith

(10) Patent No.: US 6,349,408 B1
(45) Date of Patent: Feb. 19, 2002

(54) TECHNIQUES FOR IMPLEMENTING A FRAMEWORK FOR EXTENSIBLE APPLICATIONS

(75) Inventor: Anselm Smith, San Jose, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/108,109

(22) Filed: Jun. 30, 1998

Related U.S. Application Data

(60) Provisional application No. 60/079,014, filed on Mar. 23, 1998.

(51) Int. Cl.⁷ .............................................. G06F 9/455
(52) U.S. Cl. ......................................................... 717/11
(58) Field of Search ............................ 395/712; 717/11, 717/1

(56) References Cited

U.S. PATENT DOCUMENTS

| | | | | |
|---|---|---|---|---|
| 5,748,896 A | * | 5/1998 | Daly et al. | 395/200.53 |
| 5,761,499 A | * | 6/1998 | Sonderegger | 395/610 |
| 5,835,777 A | * | 11/1998 | Staelin | 395/712 |
| 5,859,969 A | * | 1/1999 | Oki et al. | 395/200.3 |
| 5,909,575 A | * | 6/1999 | Perry | 395/653 |
| 5,933,646 A | * | 8/1999 | Hendrickson et al. | 717/11 |
| 6,023,698 A | * | 2/2000 | Lavey, Jr. et al. | 707/10 |

OTHER PUBLICATIONS

Dan. Software Resource Information Management System. Patent Abstract of Japan, Unexamined Applications, Section: P, Sect. No. 1468, vol. 17, No. 16, p. 6, Jan. 1993.*

* cited by examiner

*Primary Examiner*—Tuan Q. Dam
*Assistant Examiner*—Wei Zhen
(74) *Attorney, Agent, or Firm*—Beyer Weaver & Thomas LLP

(57) ABSTRACT

Techniques for providing extensible applications are provided. A bundle or software module can be developed that is able to install itself within an application. The software module can also inform the application upon which services the software module depends so that if the required services are not available, the application can obtain them. An activation function can be defined in the software module that registers the services provided by the software module with the application so that the services can be available to other software modules.

21 Claims, 10 Drawing Sheets

TECHNIQUES FOR IMPLEMENTING A FRAMEWORK FOR EXTENSIBLE APPLICATIONS

This application claims the benefit of U.S. patent application Ser. No. 60/079,014, filed Mar. 23, 1998, which is hereby incorporated by reference.

BACKGROUND OF THE INVENTION

The present invention relates to software applications. More specifically, the invention relates to techniques for implementing a framework for extensible applications.

The Java™ programming language is an object-oriented high level programming language developed by Sun Microsystems and designed to be portable enough to be executed on a wide range of computers ranging from small devices (e.g., pagers, cell phones and smart cards) up to supercomputers. Computer programs written in Java (and other languages) can be compiled into virtual machine instructions for execution by a Java virtual machine. In general, the Java virtual machine decodes and executes the virtual machine instructions.

The virtual machine instructions for the Java virtual machine are bytecodes, meaning they include one or more bytes. The bytecodes are stored in a particular file format called a "class file" that includes bytecodes for methods of a class. In addition to the bytecodes for methods of a class, the class file includes a symbol table as well as other ancillary information.

A computer program embodied as Java bytecodes in one or more class files is platform independent. The computer program can be executed, unmodified, on any computer that is able to run an implementation of the Java virtual machine. The Java virtual machine is a software emulator of a "generic" computer. This is a major factor in allowing computer programs for the Java virtual machine to be platform independent.

The Java virtual machine is commonly implemented as a software interpreter. Conventional interpreters decode and execute the virtual machine instructions of an interpreted program one instruction at a time during execution, which is in contrast to compilers that decode source code into native machine instructions prior to execution so that decoding is not performed during execution. Java virtual machines can be an interpreter, utilize a compiler or a combination of the two. The Java virtual machine can be written in a programming language other than the Java programming language (e.g., the C++ programming language).

As Java programs are platform independent, they are being written for a wide variety of computing devices including small handheld devices, network personal computers (NPCs), and fully functional personal computers. Each computing device can have different storage capacity, processing power, and input/output (I/O) capabilities. It would be beneficial to have techniques for providing extensible applications or, in other words, applications that can be readily extended with new features including upgrades. Additionally, it would be beneficial to make it possible to have automatic, or almost automatic, techniques for installing an application or for extending the features of an application that has been installed.

SUMMARY OF THE INVENTION

In general, embodiments of the present invention provide innovative techniques for providing extensible applications. A bundle or software module can be developed that is able to install itself within an application. This way, it is not necessary for the user to perform a complicated installation procedure. Additionally, the software module can inform the application as to the services upon which the software module depends (e.g., thread services) so that if the required services are not available, the application can obtain them. An activation function can be defined in the software module that registers the services provided by the software module with the application so that the services can be available to other software modules. Several embodiments of the invention are described below.

In one embodiment, a computer-implemented method for providing extensible applications includes receiving a software module that is to be added to an application. The software module provides one or more services to the application. An installation function of the software module can be called that creates an execution context for the software module within the application. A dependencies function of the software module can be called that informs the application of services that are required by the software module. Additionally, an activation function of the software module can be called that registers with the application the one or more services provided by the software module. In preferred embodiments, the application is a Java program.

In another embodiment, a computer-implemented method for defining a software module includes defining a service provided by the software module. An installation function for the software module can be defined that creates a execution context for the software module within an application. A dependencies function for the software module can be defined that indicates services required by the software module. Also, an activation function for the software module can be defined that registers with the application the services provided by the software module.

Other features and advantages of the invention will become readily apparent upon review of the following detailed description in association with the accompanying drawings.

DETAILED DESCRIPTION OF PREFERRED EMBODIMENTS

In the description that follows, the present invention will be described in reference to preferred embodiments that allow Java applications (or programs) to be highly extensible, meaning that it is easy to install, augment and/or upgrade the applications. In particular, examples will be described in which the invention can be used to obtain software modules over the Internet that can be easily installed in a Java application. However, the invention is not limited to any particular language, network configuration, computer architecture, or specific implementation. Therefore, the description of the embodiments that follow is for purposes of illustration and not limitation.

Figure 1:
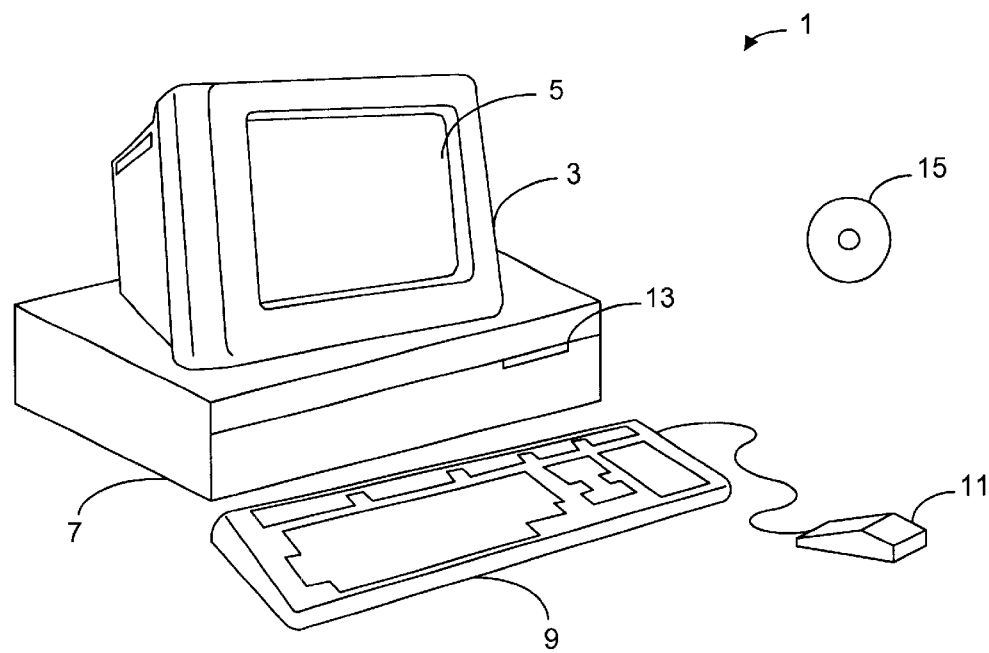
FIG. 1 illustrates an example of a computer system that can be used to execute the software of an embodiment of the invention.

FIG. 1 illustrates an example of a computer system that can be used to execute the software of an embodiment of the invention. FIG. 1 shows a computer system 1 that includes a display 3, screen 5, cabinet 7, keyboard 9, and mouse 11. Mouse 11 can have one or more buttons for interacting with a graphical user interface. Cabinet 7 houses a CD-ROM drive 13, system memory and a hard drive (see FIG. 2) which can be used to store and retrieve software programs incorporating computer code that implements the invention, data for use with the invention, and the like. Although the CD-ROM 15 is shown as an exemplary computer readable storage medium, other computer readable storage media including floppy disk, tape, flash memory, system memory, and hard drive can be used. Additionally, a data signal embodied in a carrier wave (e.g., as transmitted in a network such as the Internet) can be the computer readable storage medium.

Figure 2:
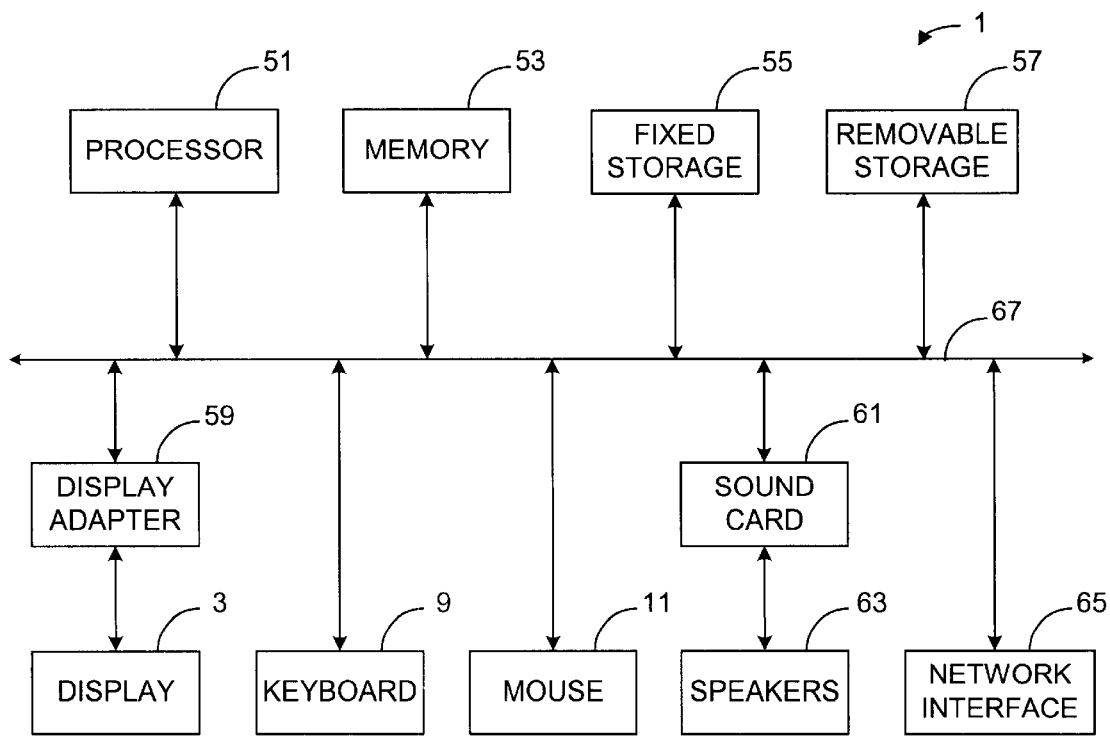
FIG. 2 shows a system block diagram of the computer system of FIG. 1.

FIG. 2 shows a system block diagram of computer system 1 used to execute the software of an embodiment of the invention. As in FIG. 1, computer system 1 includes monitor 3 and keyboard 9, and mouse 11. Computer system 1 further includes subsystems such as a central processor 51, system memory 53, fixed storage 55 (e.g., hard drive), removable storage 57 (e.g., CD-ROM drive), display adapter 59, sound card 61, speakers 63, and network interface 65. Other computer systems suitable for use with the invention can include additional or fewer subsystems. For example, another computer system could include more than one processor 51 (i.e., a multi-processor system), or a cache memory.

The system bus architecture of computer system 1 is represented by arrows 67. However, these arrows are illustrative of any interconnection scheme serving to link the subsystems. For example, a local bus could be used to connect the central processor to the system memory and display adapter. Computer system 1 shown in FIG. 2 is but an example of a computer system suitable for use with the invention. Other computer architectures having different configurations of subsystems can also be used.

Figure 3:
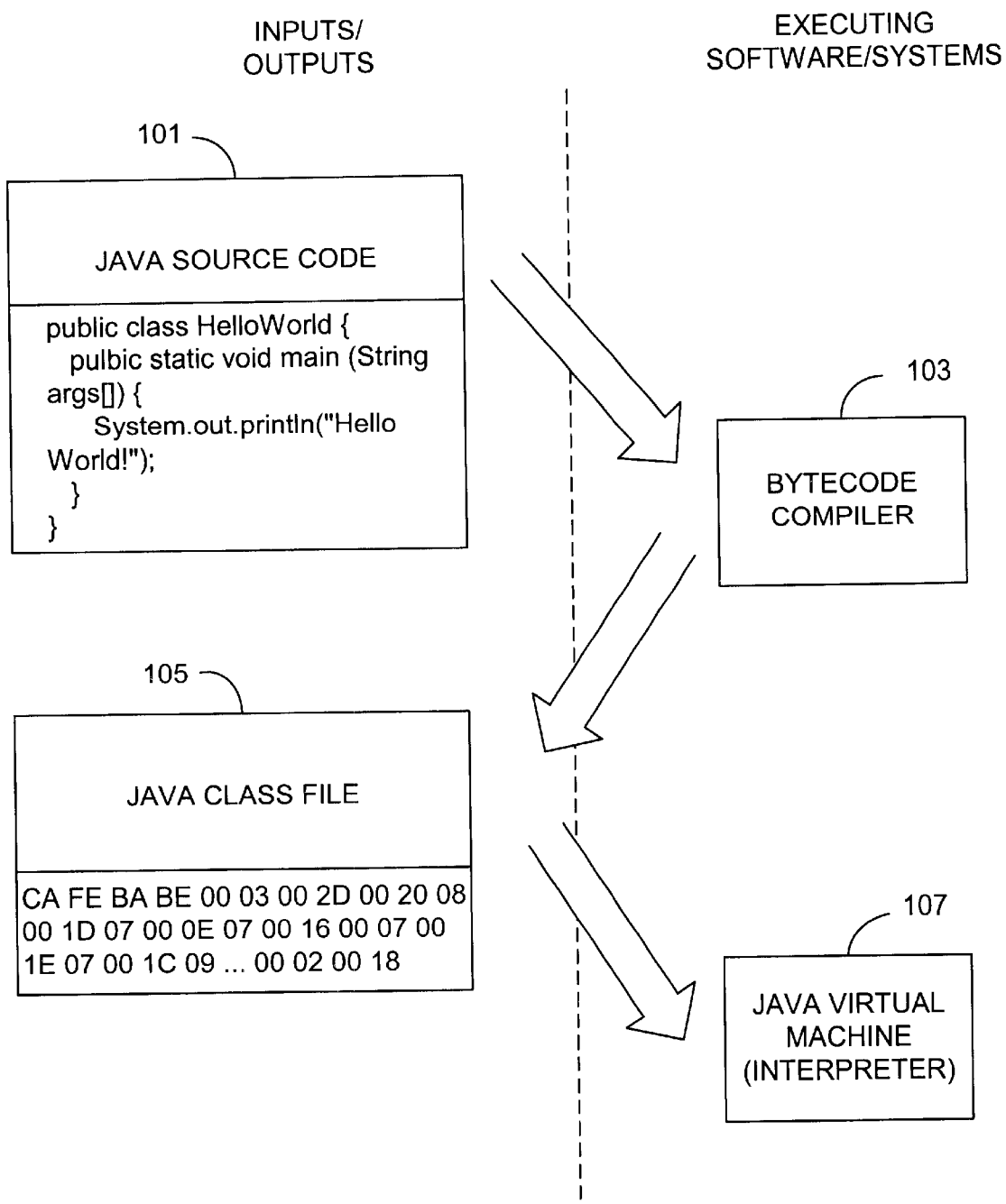
FIG. 3 shows how a Java source code program is executed.

Typically, computer programs written in the Java programming language are compiled into bytecodes or Java virtual machine instructions that are then executed by a Java virtual machine. The bytecodes are stored in class files that are input into the Java virtual machine for interpretation. FIG. 3 shows a progression of a simple piece of Java source code through execution by an interpreter, the Java virtual machine.

Java source code 101 includes the classic Hello World program written in Java. The source code is input into a bytecode compiler 103 that compiles the source code into bytecodes. The bytecodes are virtual machine instructions as they will be executed by a computer. Typically, virtual machine instructions are generic (i.e., not designed for any specific microprocessor or computer architecture) but this is not required. For example, microprocessor have been manufactured to execute Java bytecodes. The bytecode compiler outputs a Java class file 105 that includes the bytecodes for the Java program.

The Java class file is input into a Java virtual machine 107. The Java virtual machine is machine that decodes and executes the bytecodes in the Java class file. The Java virtual machine can be an interpreter, but is commonly referred to as a virtual machine as it typically emulates in software a microprocessor or computer architecture (e.g., the microprocessor or computer architecture that can not exist in hardware).

Figure 4:
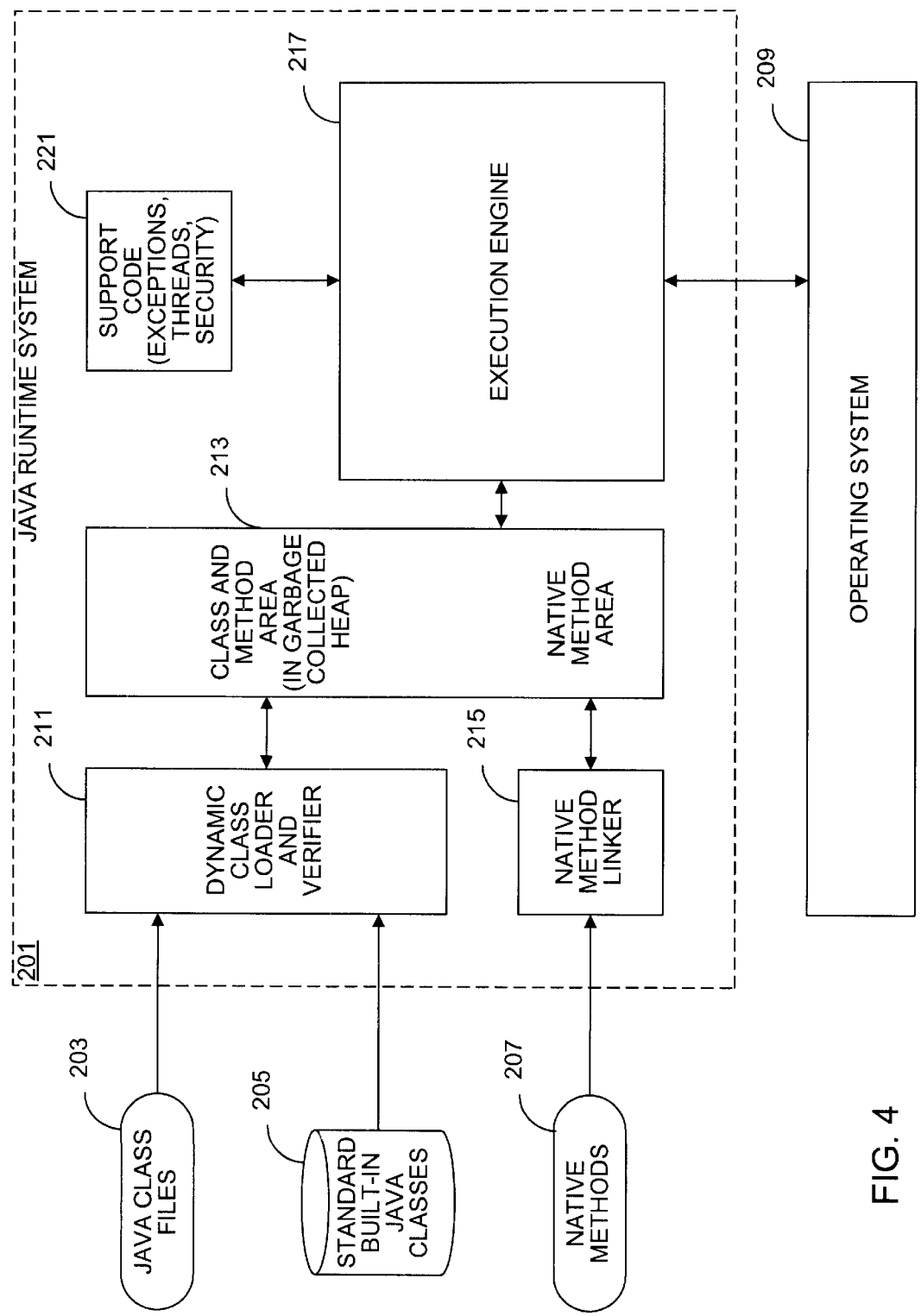
FIG. 4 shows the components of an implementation of a Java runtime system.

FIG. 4 shows the components of an implementation of a Java runtime system. Implementations of the Java virtual machine are known as Java runtime systems. A Java runtime system 201 can receive input of Java class files 203, standard built-in Java classes 205 and native methods 207 in order to execute a Java program. The standard built-in Java classes can be classes for objects such as threads, strings and the like. The native methods can be written in programming languages other than the Java programming language. The native methods are typically stored in dynamic link libraries (DLLs) or shared libraries.

The Java runtime system can also interface with an operating system 209. For example, input/output functions can be handled by the operating system, including providing the Java runtime system with interfaces to Java class files 203, standard built-in Java classes 205 and native methods 207.

A dynamic class loader and verifier 211 loads Java class files 203 and standard built-in Java classes 205 via operating system 209 into a memory 213. Additionally, the dynamic class loader and verifier can verify the correctness of the bytecodes in the Java class files, reporting any errors that are detected.

A native method linker 215 links in native methods 207 into the Java runtime system and stores the native methods in memory 213. As shown, memory 213 can include a class and method area for the Java classes and a native method area for native methods. The class and method area in memory 213 can be stored in a garbage-collected heap. As new objects are created, they are stored in the garbage-collected heap. The Java runtime system, not the application, is responsible for reclaiming memory in the garbagecollected heap when space is no longer being used.

At the heart of the Java runtime system shown in FIG. 4 is an execution engine 217. The execution engine carries out the instructions stored in memory 213 and can be implemented in software, hardware or a combination of the two. The execution engine supports object-oriented applications and conceptually, there are multiple execution engines running concurrently, one for each Java thread. Execution engine 217 can also utilize support code 221. The support code can provide functionality relating to exceptions, threads, security, and the like.

The previous paragraphs have described computers and Java applications in the abstract. Assume that a vendor has created a mail reader application that includes five servlets, numerous hypertext markup language (HTML) pages and icons. In a conventional application framework, a user can have to perform a complicated procedure to install the mail reader application. For example, the user can need to unfold the archive of the application, copy the servlets into the proper servlet directory, copy the HTML files to their proper location, put the icons in the appropriate directory. Additionally, the user can need to register all the servlets under the name that the original programmer of the application expects. The installation instructions can well span several pages of complex steps.

With an embodiment of the invention, the Java application can be easily installed within an application framework that utilizes bundles. The application developer creates a bundle (also called a "service bundle") that is a packaging unit for software components. The software components provide services so a service implementation is another way of saying a software component. In preferred embodiments, a bundle is a Java archive(jar) file that wraps a set of software components together to form a software module. In the description that follows, the terms bundle, service bundle and software module will be used interchangeably.

Where conventional application schemes concentrate on transferring software components to a host system (e.g., applets), an application framework of the invention concentrates on both the software components, runtime environment and the interaction of the software components. For example, support can be provided within the software component for it to do the following: 1) install itself in a host environment, 2) inform the host system about the services the software component needs, 3) publish to other software components the services that the software component provides, 4) uninstall itself, and 5) update to a new version.

Figure 5:
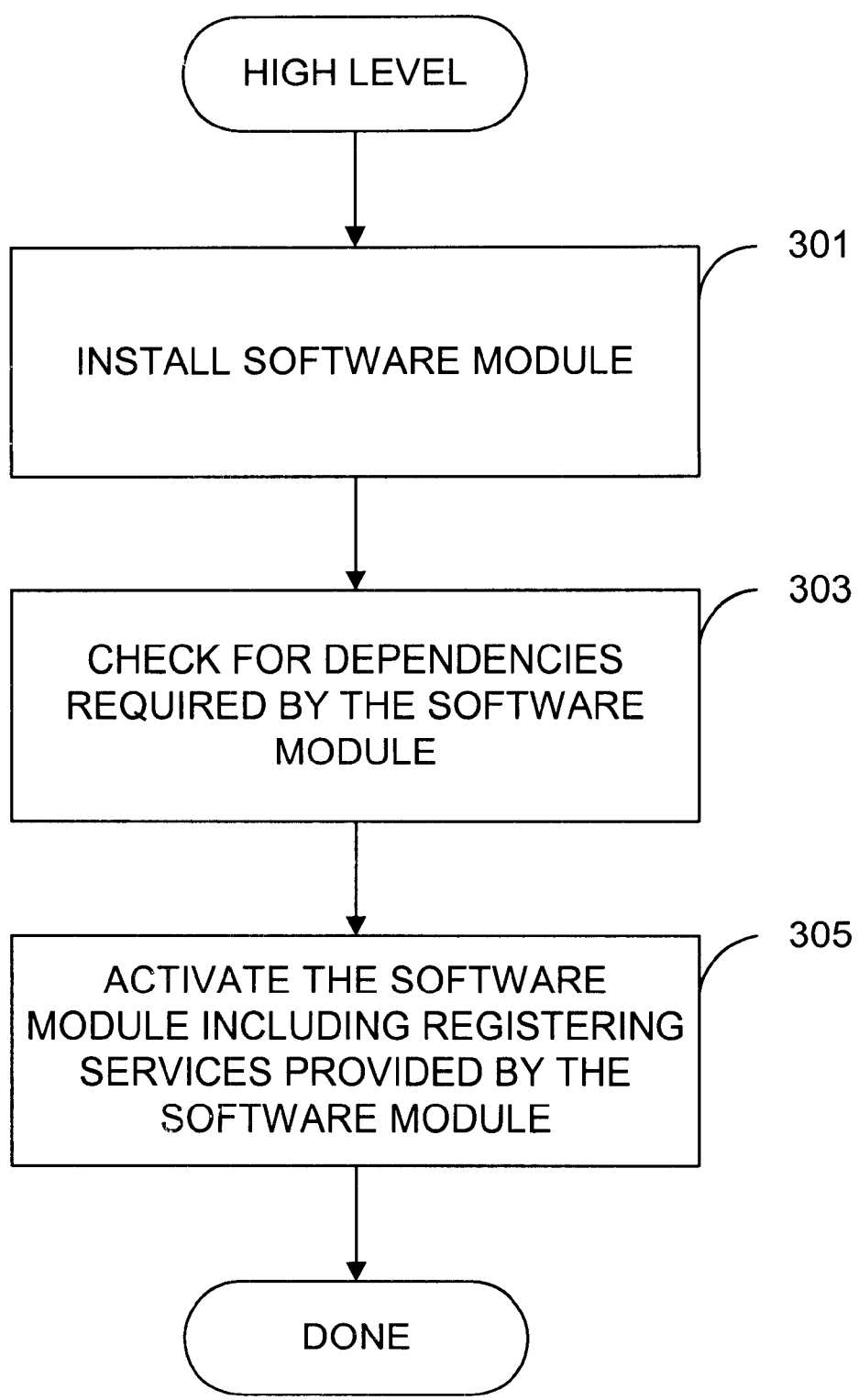
FIG. 5 illustrates a high level flowchart of an embodiment of the invention.

FIG. 5 illustrates a high level flowchart of an embodiment of the invention. The flowchart represents how a single software module can be installed into a host environment. At a step 301, a software module is installed. The software module can be installed utilizing an installation function that is provided with the software module. Installation typically includes copying the necessary files to the application framework supplied directories.

At a step 303, a check is performed for dependencies required by the software module. Once the software module is installed, the application framework can request from the software module the services it requires to execute. For example, there can be a dependencies function that returns the services upon which the software module depends. The application calls the dependencies function and determines if there are any services that are required but not currently supported in the application environment. The software module can then obtain the necessary services and install them within the application environment.

Once the software module has been installed and the dependencies checked, the software module can be activated at a step 305. Activation of the software module can include registering the services provided by the software application within the application environment. When the software module has been activated, the services it provides can be accessed by the software application.

The flowchart shown in FIG. 5 is at a very high level and more detail will be described in the description that follows. It is important to note that the flowcharts are provided for illustration of embodiments of the invention. An order of the steps should not be assumed from the order in which they are shown in the flowcharts. Moreover, steps can be added, deleted and combined without departing from the scope of the invention.

Figure 6:
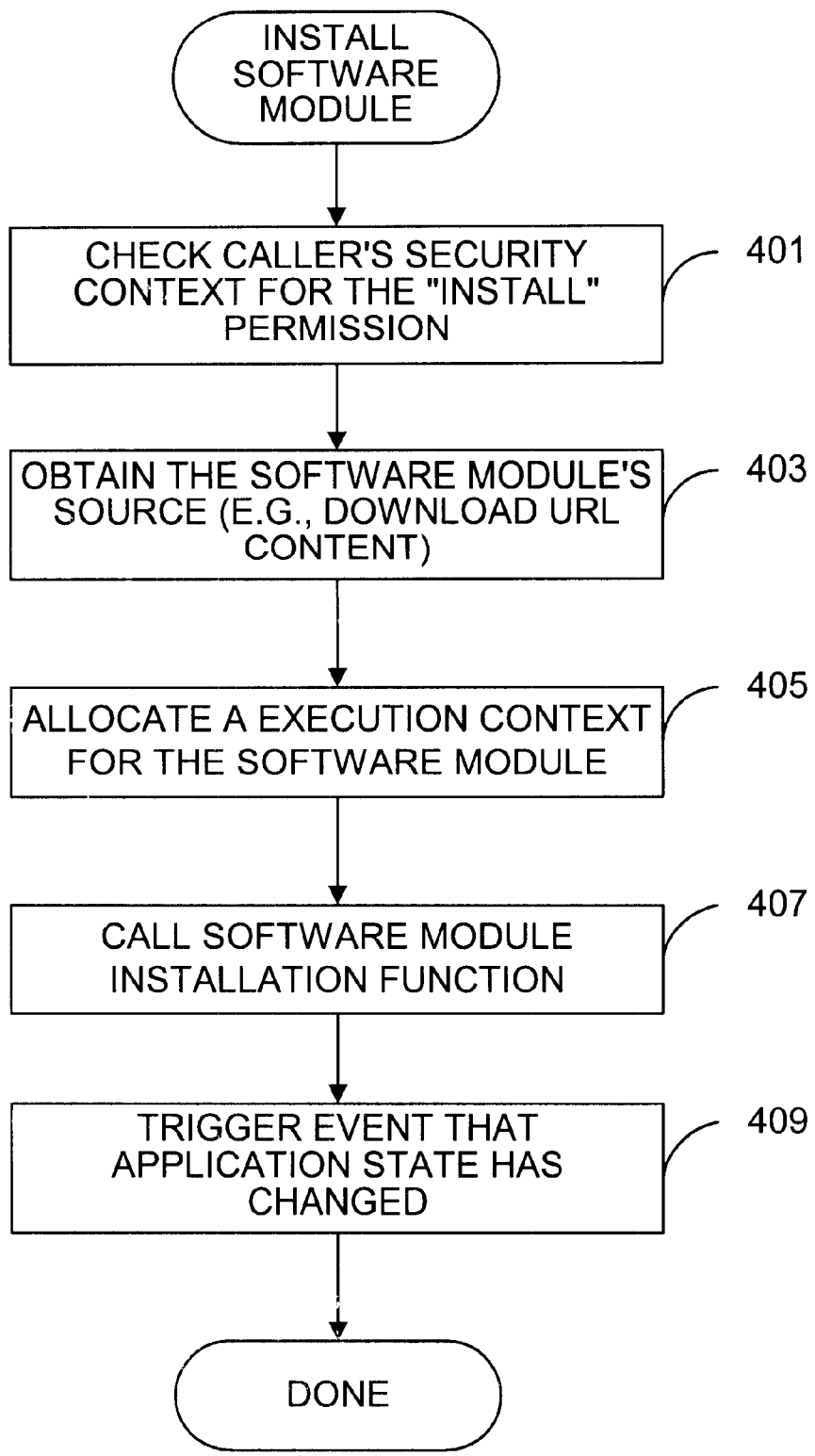
FIG. 6 shows a process of installing a software module.

FIG. 6 shows a process of installing a software module. The process shown is an embodiment of step 301 of FIG. 5. Before a software module can be installed, an instance of the software module should be available. As an example, an instance of a software module can be generated by a function that accesses a uniform resource locator (URL) source (e.g., the URL that specifies a jar file on a remote server). The creation of an instance of the software module can fail if the URL source is unreachable or the source did not include mandatory files. An instance of the software module can be installed by invoking an "install" function within the application framework, where the instance of the software component can be a parameter of the call.

At a step 401, a check is made to see if the caller's security context allows it to perform the install operation. The install operation is defined within the application environment and initiates the remaining steps of FIG. 6. If the caller has the appropriate permission, the software module's source can be obtained at a step 403. As with many other steps, if the appropriate permission is not available, an exception, in this case a security exception, can be thrown. The software module's source can be obtained from any number of locations including a local cache, local hard drive, remote storage (e.g., specified by a URL), and the like.

The execution context for the software module with the application environment is allocated at a step 405. The execution context typically includes any associated resources that the software module can require (e.g., persistent storage in the form of file space). Now that the execution context for the software module is available, the software function can be installed.

The software module can include an installation function defined that installs the software module. If such an installation function exists, it is called at a step 407. The installation function performs an automatic installation of the software module. For programming ease, a default installation function is provided in preferred application frameworks that can be used if no specific installation procedure is required.

Once the software module is installed in the application environment, an event is triggered that the application state or environment has changed at a step 409. The event notifies software modules that are set in a mode to receive such events ("listeners") that the application state has changed. This allows the software modules not only to recognize the change in application state but also to take advantage of the new application environment. Additionally, software modules can be notified when services are no longer available (e.g., uninstalled) so that the software modules can remove references to the unavailable services.

after a software module is installed, it can either be started or uninstalled. Starting a software module can be performed by the process shown in FIG. 7.

Figure 7:
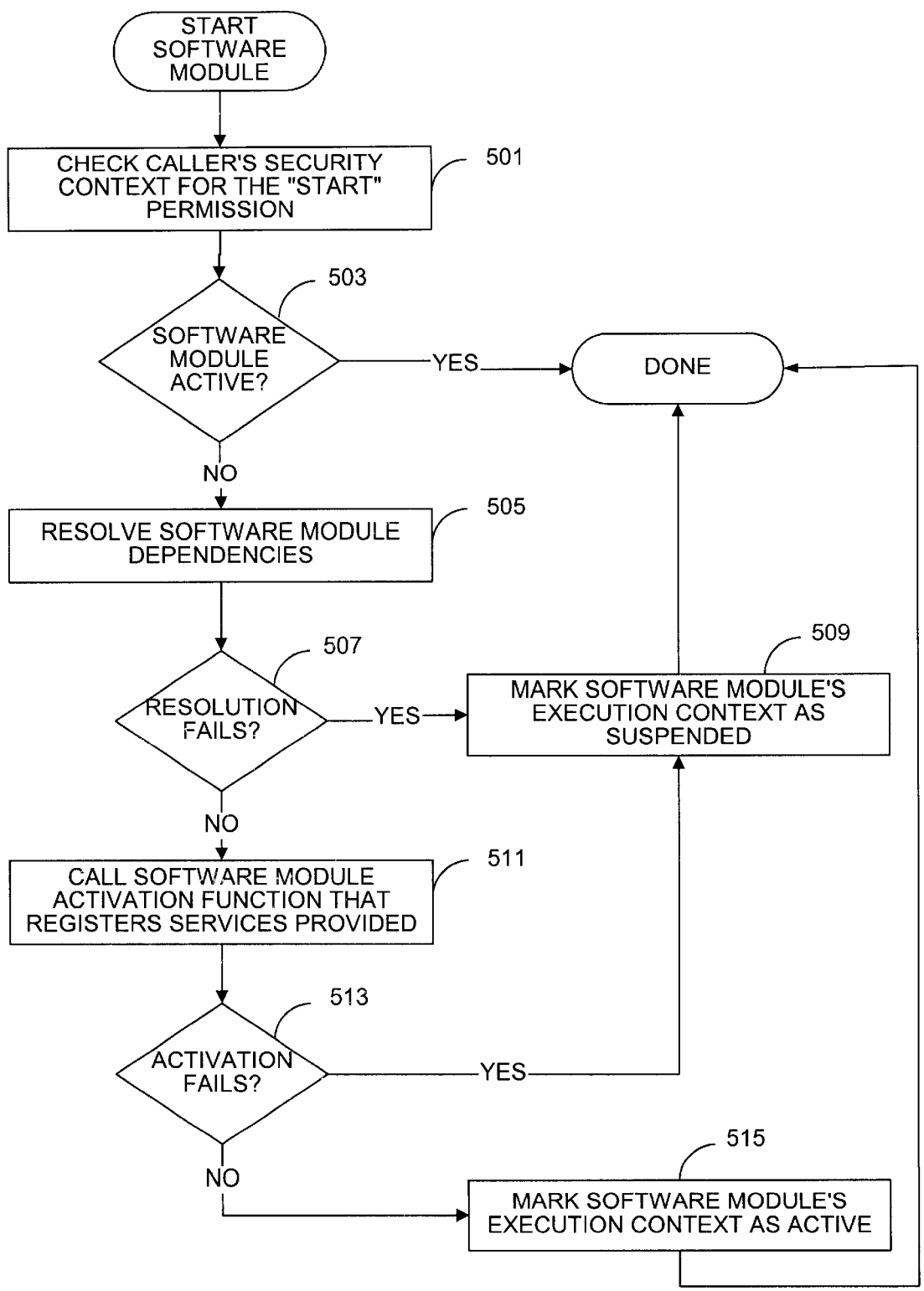
FIG. 7 shows a process of starting a software module including resolving software module dependencies and registering services provided by the software module.

FIG. 7 shows a process of starting a software module including resolving software module dependencies and registering services provided by the software module. The process shows more details for steps 303 and 305 of FIG. 5. At a step 501, a check is made to see if the caller's security context allows it to perform the start operation. The start operation is defined within the application environment and initiates the remaining steps of FIG. 7. A security exception can be thrown if the caller does not have the appropriate permission.

A software module can be either active or suspended (also called "stopped"). At a step 503, it is determined if the software module is active. If it is active, the software module has already been started. If it is suspended, software module dependencies are resolved at a step 505.

Resolving software module dependencies typically includes calling a dependencies function of the software module that will indicate which services are required by the software module. The application then determines if each of the required services is available by checking a list of available services. If there are any services that are required but not available, the software module attempts to obtain the services. For example, a software can indicate that it requires thread services that are not currently available in the application environment. The software module can then attempt to install other software modules that provide the required thread services.

If the dependency resolution fails (e.g., the required services could not be located or the caller did not have the appropriate security permission) at a step 507, the software module is marked as suspended at a step 509. Otherwise, an activation function of the software module is called at a step 511. The activation function registers the services provided by the software module with the application. In this manner, other software modules can take advantage of the services that are made available by the newly added software module.

If the activation fails at a step 513, the software module is marked as suspended at a step 509. Otherwise, the software module is marked as active at a step 515 and the software module has been activated.

Figure 8:
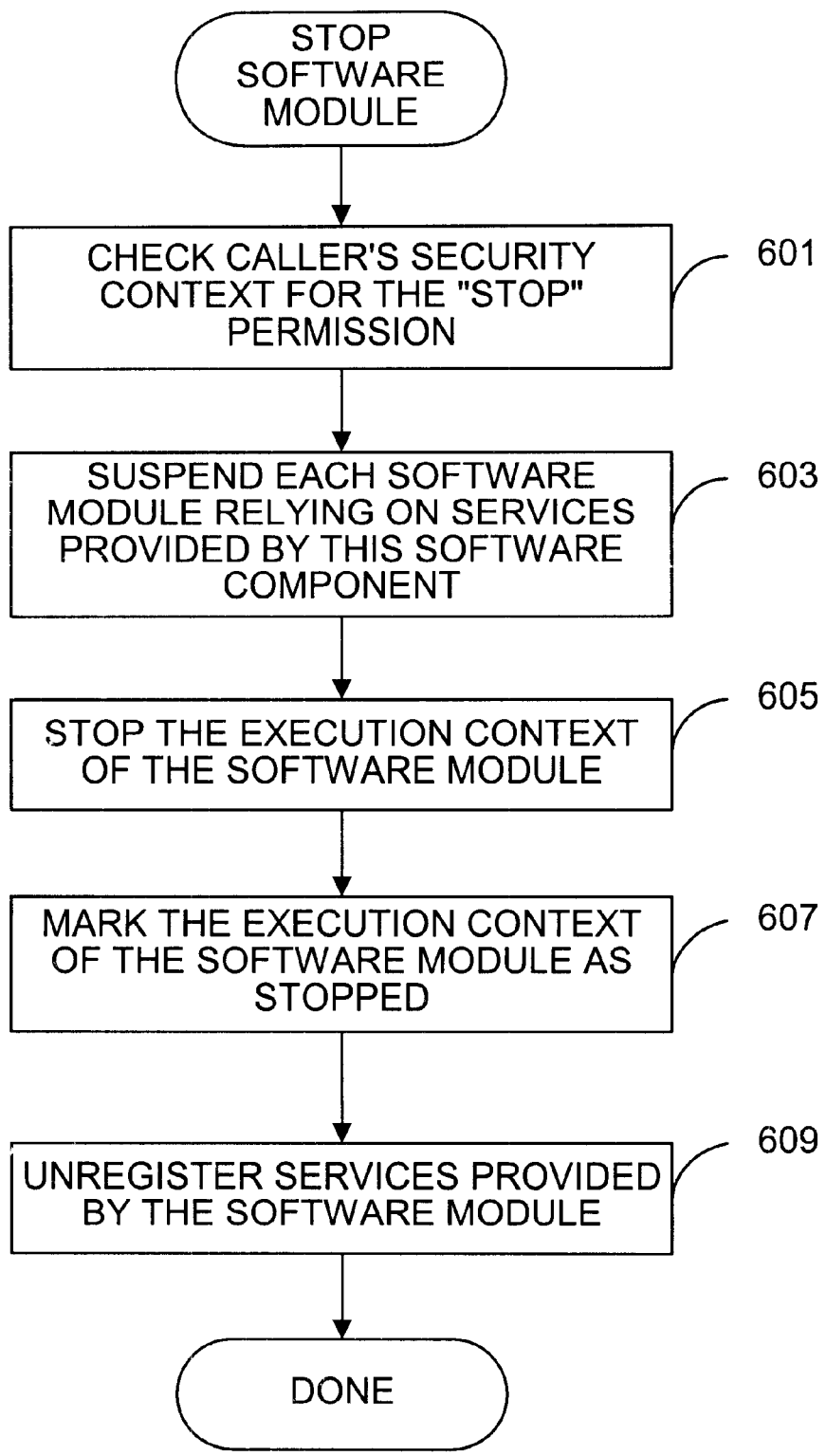
FIG. 8 shows a process of stopping a software module.

At times, it can be desirable to stop a software module from being able to be executed. FIG. 8 shows a process of stopping a software module. At a step 601, a check is made to see if the caller's security context allows it to perform the stop operation. The stop operation is defined within the application environment and initiates the remaining steps of FIG. 8. A security exception can be thrown if the caller does not have the appropriate permission.

If the caller has the appropriate permission, the application can, at a step 603, suspend each software module relying on services provided by the software module to be stopped. At a step 605, the execution context of the software module can be stopped. This can be performed by calling an activation function included in the software module if one is available. Otherwise, an externally defined default activation function can be used to stop the execution context of the software module.

At a step 607, the execution context of the software module is marked as stopped. The services provided by the stopped software module are unregistered at a step 609 so that they are no longer available within the application environment.

Figure 9:
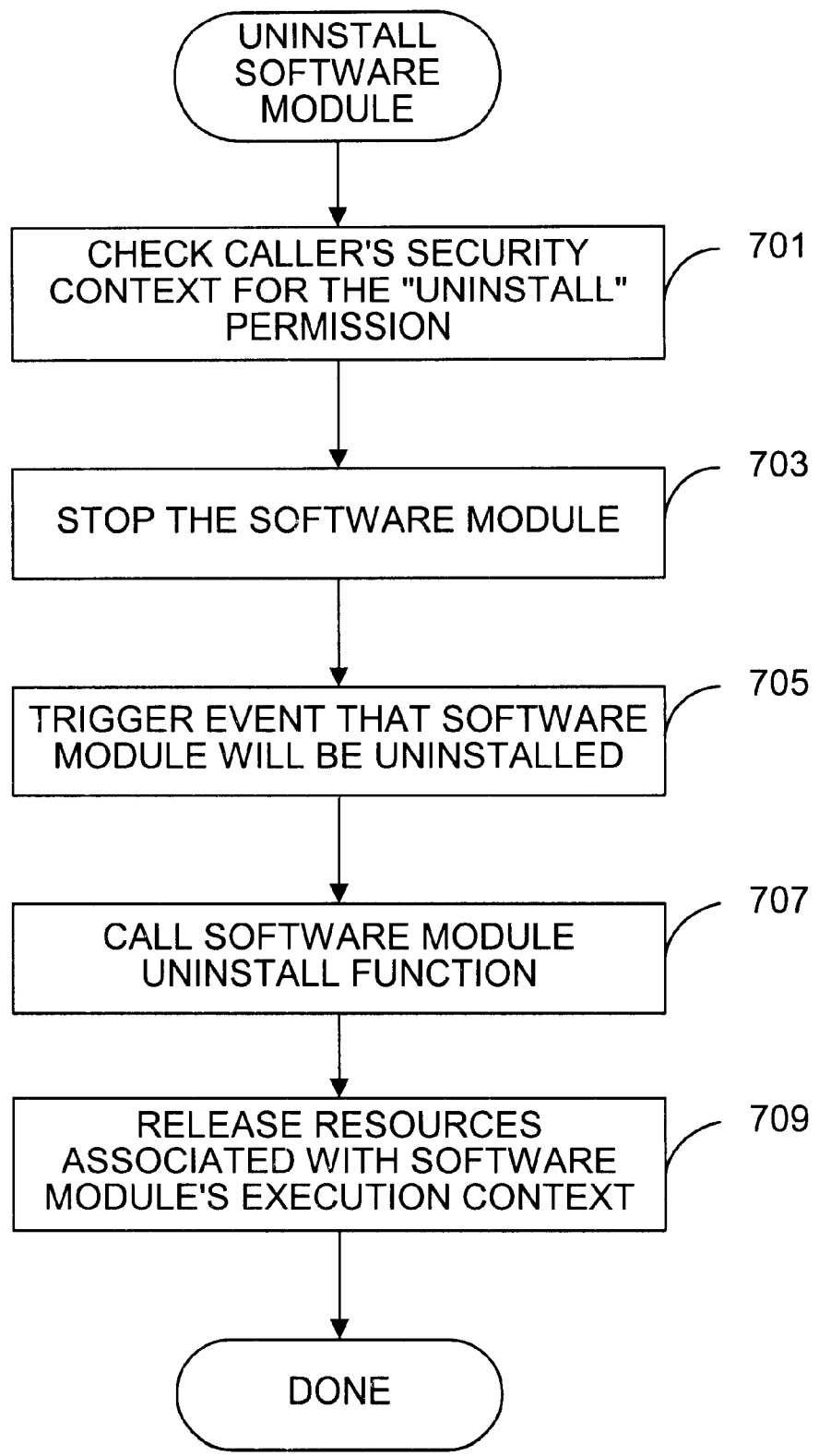
FIG. 9 shows a process of uninstalling a software module.

If an application has been requested to uninstall a software module, the software module can be uninstalled by a process shown in FIG. 9. At a step 701, a check is made to see if the caller's security context allows it to perform the uninstall operation. The uninstall operation is defined within the application environment and initiates the remaining steps of FIG. 9. A security exception can be thrown if the caller does not have the appropriate permission.

If the caller has the appropriate permission, the application can stop the software module at a step 703. The software module can be stopped by the process shown in FIG. 8. An event can be triggered, at a step 705, to inform listening software modules that the software module will be uninstalled. The software module can be uninstalled by calling an uninstall function of the software module at a step 707. The uninstall function typically performs the same steps as the install function just in reverse order and reverse function (e.g., deallocate space instead of allocate). At a step 709, all resources associated with the software module's execution context can be released.

Figure 10:
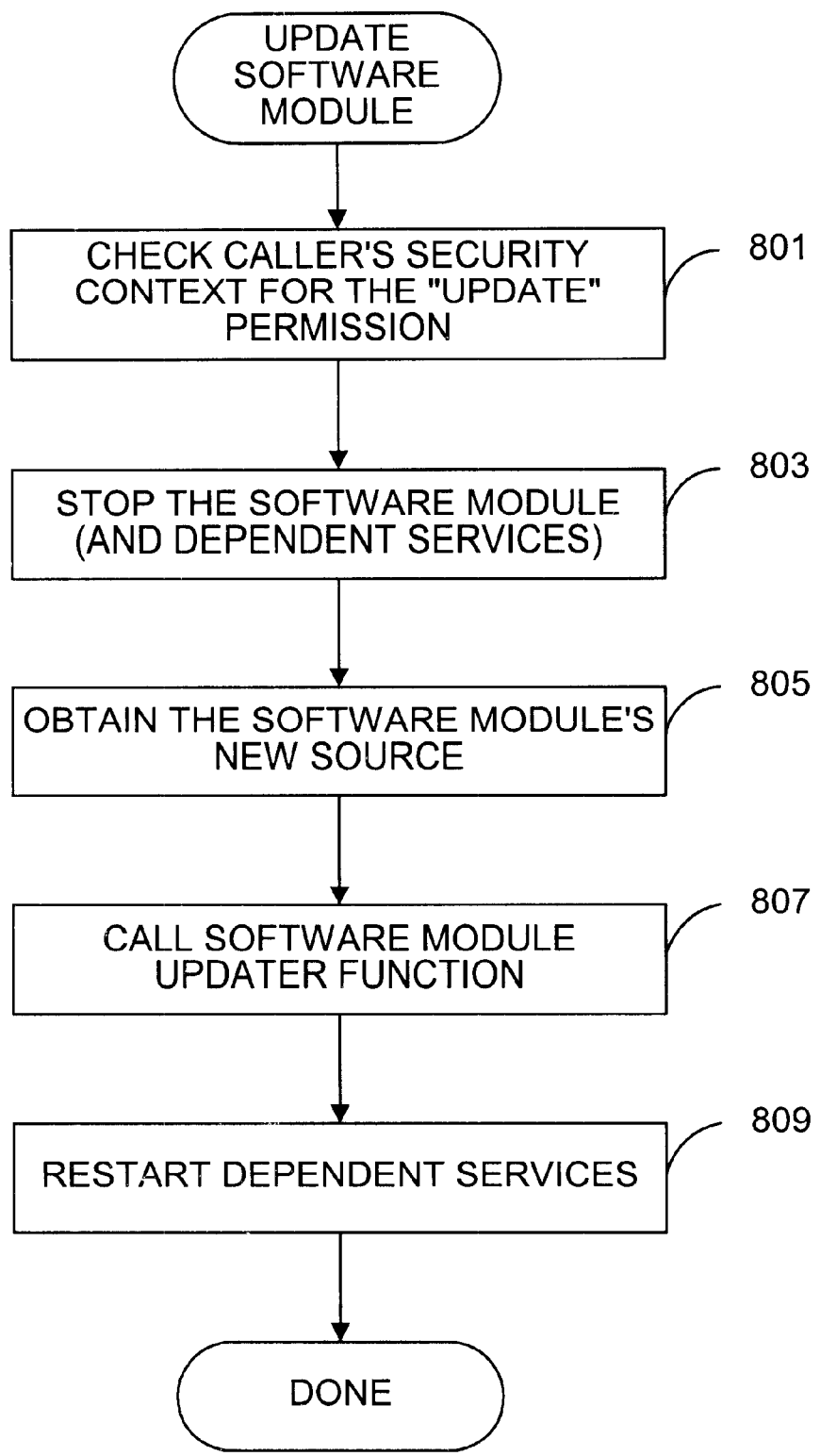
FIG. 10 shows a process of updating a software module.

An application can also be requested to update a software module. FIG. 10 shows a process of uninstalling a software module. At a step 801, a check is made to see if the caller's security context allows it to perform the update operation. The update operation is defined within the application environment and initiates the remaining steps of FIG. 10. A security exception can be thrown if the caller does not have the appropriate permission.

If the caller has the appropriate permission, the application can stop the software module and the services that depend on the software module at a step 803. The software module can be stopped by the process shown in FIG. 8.

At a step 805, the software module's new source can be obtained. In a preferred embodiment, the new source location (e.g., URL) is requested from the software module. The software module can be updated by calling an updater function of the software module at a step 807. The updater function is preferably performed by the software module so that persistent storage can be transferred to the updated software module, as desired. For example, if the persistent storage of the software module includes some user settings, these settings can be carried forward to the new version. At a step 809, the services that are dependent on the software module are restarted.

Figure 11:
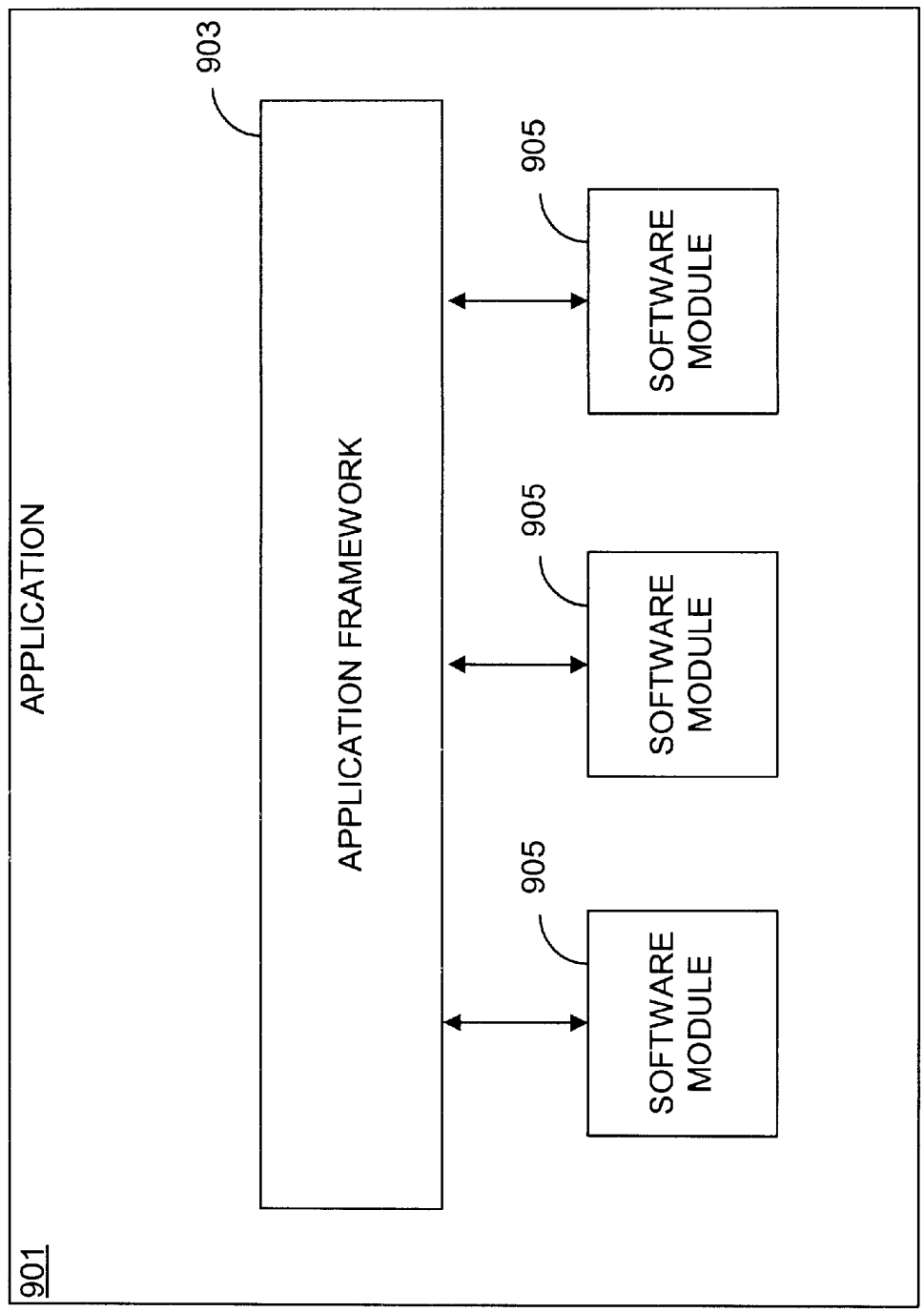
FIG. 11 illustrates an application, application framework and software modules.

The above has described how the invention operates. FIG. 11 shows an embodiment including an application 901, an application framework 903, and software modules 905. Application 901 can be any conventional software application. Within the application is application framework 903, which hosts software modules 905. Accordingly, the software modules can be installed within application 901 utilizing application framework 903. In some embodiments, the application framework itself can function as the application. Additionally, the application framework itself can be on a remote server (i.e., non-local to the application).

A specific application of the invention will now be described. As handheld devices become more popular, a company can design a calendar application that runs as a Java programs so that it is platform independent and thus can be executed on any handheld device that includes a Java virtual machine.

Although the Java virtual machine allows the same application to run on different handheld devices, the devices themselves can have different hardware characteristics. For example, they can have different storage capacities. Thus, the company designs the calendar application so that it is modular. Utilizing the principles of the invention, the company makes discrete bundles or software modules available on the Internet for a fee. The software modules can perform any number of tasks including reminders, spell check, sound, and the like.

A user can download and easily install the calendar application with the invention. The software modules can automatically install themselves in the application environment of the handheld device (e.g., the software modules can be installed into the application framework of the application). At a time later, assume the user desires to add a software module such as reminder services. The user would also be able to easily install the reminder services embodying principles of the invention. Assume for the moment that the reminder services rely on the sound services, the reminder services can automatically install the sound services when the reminder services are installed as described in reference to step 505 of FIG. 7.

With embodiments of the invention, software modules can be self-installed in an application environment. This allows for easy installation of applications, but also easy installation of additional software modules and upgrades to new versions of existing software modules. Furthermore, the invention can determine which services are required for the requested software modules and automatically obtain and install the software modules that perform the required services.

While the above is a complete description of preferred embodiments of the invention, various alternatives, modifications, and equivalents can be used. It should be evident that the invention is equally applicable by making appropriate modifications to the embodiments described above. For example, the embodiments described have been in reference to an application executed by a Java virtual machine, but the principles of the present invention can be readily applied to other systems and languages. Therefore, the above description should not be taken as limiting the scope of the invention that is defined by the metes and bounds of the appended claims along with their full scope of equivalents.

What is claimed is:

1. In a computer system, a method for providing a software module within an application, the method comprising:

receiving the software module that is to be added to the application, the software module providing at least one service to the application;

calling an installation function of the software module that creates an execution context for the software module within the application; and calling a dependencies function of the software module that informs the application of services that are required by the software module.

2. The method of claim 1, further comprising calling an activation function of the software module that registers with the application the at least one service provided by the software module.

3. The method as recited in claim 2, wherein calling the activation function of the software module is performed automatically when an install function is invoked within the application.

4. The method of claim 1, further comprising calling an updater function of the software module that installs a new version of the software module.

5. The method of claim 4, wherein the method of claim 1 is repeated for each software module of the application.

6. The method as recited in claim 4, wherein calling the updater function of the software module is performed when an install function is invoked by the application.

7. The method of claim 1, wherein the software module includes a plurality of software components.

8. The method of claim 1, wherein receiving a software module includes accessing the software module from a remote server.

9. The method of claim 1, wherein the application is a Java program.

10. The method as recited in claim 1, further comprising:

calling an updater function of the software module that de-installs the software module.

11. The method as recited in claim 1, further comprising:

calling an updater function of the software module that installs one or more of the services that are required by the software module when the application determines that the one or more services are unavailable.

12. The method as recited in claim 1, further comprising:

calling an updater function of the software module that attempts to install one or more of the services that are required by the software module when the application determines that the one or more services are unavailable.

13. The method as recited in claim 12, wherein calling the updater function of the software module is performed when an install function is invoked by the application.

14. The method as recited in claim 1, wherein calling the installation function of the software module and calling the dependencies function of the software module are performed automatically when an install function is invoked within the application.

15. The method as recited in claim 14, further comprising:

calling the install function with an instance of the software module as a parameter.

16. A computer program product for providing a software module within an application, comprising:

computer code that receives a software module that is to be added to an application, the software module providing at least one service to the application;

computer code that calls an installation function of the software module that creates an execution context for the software module within the application;

computer code that calls a dependencies function of the software module that informs the application of services that are required by the software module; and a computer readable medium that stores the computer codes.

17. The computer program product of claim 16, wherein the computer readable medium is selected from the group consisting of CD-ROM, floppy disk, tape, flash memory, system memory, hard drive, and data signal embodied in a carrier wave.

18. In a computer system, a method for defining a software module that is configured for installation within an application, the method comprising:

defining a service provided by the software module;

defining an installation function of the software module that creates an execution context for the software module within the application;

defining a dependencies function of the software module that indicates services required by the software module; and defining an activation function of the software module that registers with the application the services provided by the software module.

19. The method of claim 18, further defining an updater function for the software module that installs a new version of the software module.

20. A computer program product of a software module configured for installation within an application, comprising:

computer code that retrieves information regarding active objects at a first point in time of the execution of an object-oriented program;

computer code that defines a service provided by the software module;

computer code that defines an installation function of the software module that creates an execution context for the software module within the application;

computer code that defines a dependencies function of the software module that indicates services required by the software module;

computer code that defines an activation function for the software module that registers with the application the services provided by the software module; and a computer readable medium that stores the computer codes.

21. The computer program product of claim 20, wherein the computer readable medium is selected from the group consisting of CD-ROM, floppy disk, tape, flash memory, system memory, hard drive, and data signal embodied in a carrier wave.

* * * * *